United States Patent [19]

Masuda et al.

[11] Patent Number: 4,761,650
[45] Date of Patent: Aug. 2, 1988

[54] SYSTEM FOR MEASURING HEIGHT DISTRIBUTIONS OF ATMOSPHERIC TEMPERATURE, WIND DIRECTION AND WIND SPEED

[75] Inventors: Yoshihisa Masuda, Musashino; Hisao Inuki, Higashi-Murayama; Kozo Takahashi, Higashi-Kurume, all of Japan

[73] Assignee: Communications Research Laboratory, Ministry of Posts and Telecommunications, Tokyo, Japan

[21] Appl. No.: 938,470

[22] Filed: Dec. 5, 1986

[30] Foreign Application Priority Data

Dec. 6, 1985 [JP] Japan ................................ 60-273499

[51] Int. Cl.$^4$ ............................................. G01S 13/95
[52] U.S. Cl. ........................................ 342/26; 342/52
[58] Field of Search ................................ 342/26, 52

[56] References Cited

U.S. PATENT DOCUMENTS

| | | | |
|---|---|---|---|
| 3,139,617 | 6/1964 | Denman et al. | 342/52 X |
| 4,219,887 | 8/1980 | MacCready et al. | 342/26 X |
| 4,222,265 | 9/1980 | Ravussin | 342/26 X |
| 4,286,462 | 9/1981 | Bourne | 342/26 X |
| 4,351,188 | 9/1982 | Fukushima et al. | 342/26 X |
| 4,481,517 | 11/1984 | Brown | 342/26 X |
| 4,647,933 | 3/1987 | Hogg | 342/26 |

FOREIGN PATENT DOCUMENTS

| | | | |
|---|---|---|---|
| 832509 | 5/1981 | U.S.S.R. | 342/26 |
| 883837 | 11/1981 | U.S.S.R. | 342/26 |
| 1008683 | 3/1983 | U.S.S.R. | 342/26 |

Primary Examiner—T. H. Tubbesing
Attorney, Agent, or Firm—Oblon, Fisher, Spivak, McClelland & Maier

[57] ABSTRACT

A system for measuring height distributions of atmospheric temperature and wind velocity (wind direction and wind speed) utilizes the facts that a sound wavefront in the atmosphere constitutes part of an ellipsoidal surface and that there always exists a normal which passes through an interior point of the ellipsoid. The Doppler radar is capable of measuring a height distribution of wind velocity on the basis of Doppler frequencies of scattered waves produced by the atmospheric turbulence. The radar and generator are arranged on a straight line in the wind direction so that a radio wave from the radar is directed to the wavefront of a sound wave from the generator. The radar antenna beam is scanned so that it perpendicularly intersects the sound wavefront. The speed of the sound wavefront is measured from the Doppler frequencies of reflected waves. The sound speed is obtained by removing the wind speed component from the measured speed of the sound wavefront. The sound speed obtained is calculated in terms of atmospheric temperature, thereby obtaining the height distribution of the atmospheric temperature.

3 Claims, 8 Drawing Sheets

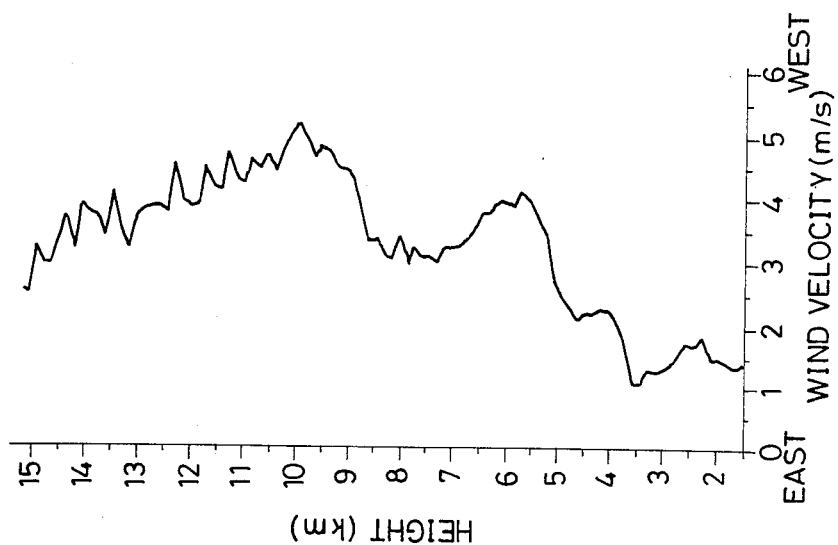
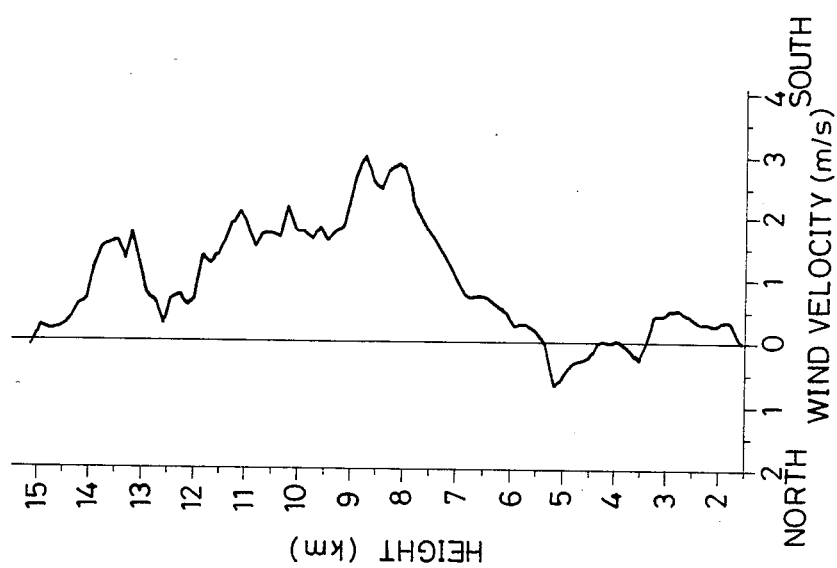

SYSTEM FOR MEASURING HEIGHT DISTRIBUTIONS OF ATMOSPHERIC TEMPERATURE, WIND DIRECTION AND WIND SPEED

FIELD OF THE INVENTION AND RELATED ART STATEMENT

This invention relates to a system for measuring height distributions of the atmospheric temperature and wind velocity (direction and speed) in a height range of about 2 km to 20 km utilizing a radio acoustic sounding system (RASS).

The RASS is considered to be a promising system utilizable for remote control measurement of the height distributions of atmospheric temperature and wind velocity. It features utilization of the reflection of radio waves by wavefronts of sound. It is used, for instance, to form a height distribution of the atmospheric temperature by receiving reflected radio waves from several tens of wavefronts of sound in the same phase and calculating the atmospheric temperature at the wavefronts from their Doppler frequencies. In the prior art RASS, the wavefront in the atmosphere is thought of as a spherical surface.

A prior art RASS having a single transmitting-/receiving antenna is used for the sole purpose of forming a height distribution of the atmospheric temperature. When there is wind, however, the measurement can be done only up to a height of several hundred meters. A RASS which uses a multiplicity of receiving antennas can measure height distributions of the atmospheric temperature and wind velocity (U.S. Pat. No. 4,351,188). However, the antenna installation area is proportional to the product of the upper limit of the height range for measurement and the wind speed (i.e., the diameter of the receiving area is equal to twice the upper limit of the height range multiplied by the ratio of the average measured wind speed to the speed of sound). This means that for the measurement of the height distributions of the atmospheric temperature and wind velocity up to a height of 3 km and up to an average wind speed of 50 m/sec., for instance, an area having a diameter of 1 km is necessary, and a large number of antennas have to be installed in such area.

Further, with a RASS with the antenna beam direction fixed to the zenith the upper limit of the height range for measurement varies greatly with the wind speed, so that measurement up to a large height cannot be made at all times.

OBJECT AND SUMMARY OF THE INVENTION

An object of the invention is to provide a system for measuring height distributions of the atmospheric temperature and wind velocity, which permits continuous and accurate measurement of height distributions of the atmospheric temperature and wind velocity up to a height of about 20 km without being influenced by winds.

Another object of the invention is to provide a system for measuring height distributions of the atmospheric temperature and wind velocity up to a height of about 20 km only with a pair of a sound wave generator and a Doppler radar.

To attain the above objects, according to the invention use is made of the facts that a wavefront of sound in the atmosphere constitutes part of an ellipsoidal surface and there is always a normal passing through an interior point of the ellipsoid.

A pulse Doppler radar capable of measuring height distributions of the wind velocity on the basis of Doppler frequencies of scattered radio waves produced by turbulence of the atmosphere and a sound wave generator are arranged on a straight line in the wind direction, a sound wave is emitted from the sound wave generator, and a radio wave is emitted from the Doppler radar toward the wavefront of the emitted sound wave. The radar antenna beam is scanned so that the wavefront and radar antenna beam intersect each other perpendicularly. The speed of the wavefront of sound is measured from the Doppler frequencies of reflected radio waves from the wavefront of sound. The wind speed is measured from the Doppler frequencies of scattered radio waves produced by the atmospheric turbulence. The sound speed is obtained by removing the wind speed component from the measured speed of the wavefront of sound by utilizing the measured wind speed. The value of the sound speed thus obtained is calculated in terms of atmospheric temperature, thereby obtaining the height distribution of the atmospheric temperature.

The above and other objects and features of the invention will become more apparent from the following detailed description with reference to the accompanying drawings.

BRIEF DESCRIPTION OF THE DRAWINGS

FIG. 7(a) is a graph showing a height distribution of the south-north wind speed components obtained in accordance with the system of the present invention.

FIG. 7(b) is a graph showing a height distribution of the east-west wind speed components obtained in accordance with the system of the present invention;

DETAILED DESCRIPTION OF THE PREFERRED EMBODIMENT

First, the principles underlying the present invention will be described with reference to FIGS. 1 to 3.

Figure 1:
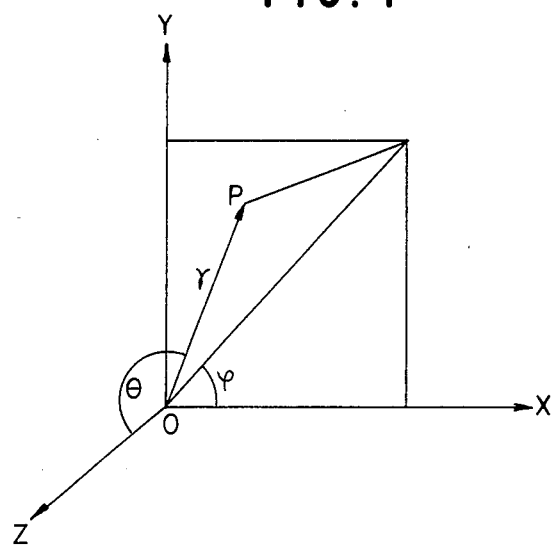
FIG. 1 is a graph showing coordinates for equations of the wavefront of sound.

In the orthogonal coordinate system shown in FIG. 1, the x-axis is graduated for the velocity of wind at a point P in a horizontal plane, and the y-axis is graduated for the zenith direction. Of the wind velocity, the vertical component can be usually ignored when the average for a short period of time is considered. Therefore, the wavefront of sound can be expressed by the following equations of motion ($\dot{x}$ being the time differential of variable x).

$$\dot{x} = s \sin\theta \cos\phi + v$$

$$\dot{y} = s \sin\theta \sin\phi \quad (1)$$

$$\dot{Z} = S \cos\theta$$

where $\theta$ and $\phi$ are angles of the point P in the polar coordinates, s the absolute value of the speed of sound and v the absolute value of the wind speed. The value s is represented by the following equation.

$$s = 20.0463 \, T^{\frac{1}{2}} \, (\text{m/sec}) \quad (2)$$

where T is the temperature of the atmosphere in Kelvin.

By time integrating the equations (1) and removing $\theta$ and $\phi$, the equations expressing the wavefront of sound are obtained.

The speeds s and v are functions of time t and point P (x, y, z). Hereinafter, they are considered to be average values during measurement time $\delta t$, so they are functions of the sole point P during time $\delta t$. As noted above, v can be dealt with as a function solely of y. The speed s is a function of the atmospheric temperature as shown by the equation (2). Usually, the atmospheric temperature, like the wind speed, is thought to be constant in a horizontal plane, so that it is dealt with as a function solely of y. First approximations to speeds v and s are expressed by the following equations.

$$v = v_0 + v'y \quad (3)$$

$$s = s_0 - s'y \quad (4)$$

where $v_0$ is the wind speed in the x-axis direction in a plane of y=0, $s_0$ the absolute value of the speed of sound in a plane of y=0, $v' = \partial v/\partial y$, and $s' = -\partial s/\partial y$ (which is approximately 0.004/sec in the lower atmosphere).

The variables $v_0$, $v'$, $s_0$ and $s'$ are all functions of time t and point P. Like v and s, their average values during the measurement time $\delta t$ are considered, so they are considered to be constants during time $\delta t$.

Where the equations (3) and (4) hold, the time differential of $\phi$ in equations (1) is $$\dot{\phi} = s' \cos\phi - v'(\cos^2\phi + \sin^2\phi) = s' \cos\phi - v'.$$

In this equation, the term "$s' \cos\phi - v' \cos^2\phi$" represents the refraction of the sound wave by Snell's law (rotation of wavefront), and the term "$-v' \sin^2\phi$" represents the bending of the sound wave due to changes in the wind speed with altitude (wind shear) or Ray's bending. In consideration of the above equation, by deriving higher order differentials of the equations (1) with $\theta = 0$ and substituting them into the Taylor expansions of x, y and z, the following equations are obtained.

$$x = v_0 t + \sin\theta_0 s_0 t \{\cos\phi_0 - \tfrac{1}{2}(1+\sin\theta_0) \times \sin\phi_0 \cos\phi_0 \\ s't + \sin\phi_0 v't + \ldots\} \quad (5)$$

$$y = \sin\theta_0 s_0 t \{\sin\phi_0 + \tfrac{1}{2}(\cos^2\phi_0 - \sin\theta_0 \times \sin^2\phi_0) \\ s't - \tfrac{1}{2}\cos\phi_0 v't + \ldots\} \quad (6)$$

$$z = \cos\theta_0 s_0 t \{1 - \tfrac{1}{2}\sin\theta_0 \sin\phi_0 s't + \ldots\}$$

where x=y=z=0, $\theta = \theta_0$ and $\phi = \phi_0$ when t=0.

In ordinary observation of the atmosphere (at heights of 10 km or below), the absolute values of s't and v't are less than 0.1. Therefore, by ignoring their second and higher order terms and removing $\theta_0$ and $\phi_0$ from the above equations, the following equation is obtained.

$$(x - v_0 t)^2 + (y + \tfrac{1}{2} s' s_0 t^2)^2 + z^2 - (x - v_0 t) y v't = (s_0 t)^2 \quad (7)$$

By shifting the origin in the above equation to a point $$\left( v_0 t - \frac{s' v' t^2 / 4}{1 - (v't/2)^2} s_0 t, \, -\frac{s' t/2}{1 - (v't/2)^2} s_0 t, \, 0 \right)$$

and rotating the system about the z-axis by angle $\Psi$, we obtain the following equation of a ellipsoidal surface.

$$(X/a)^2 + (Y/b)^2 + (Z/c)^2 = 1 \quad (8)$$

where X, Y, Z: variables after the coordinate transformation $$a \approx (1 + v't/4) s_0 t$$

$$b \approx (1 - v't/4) s_0 t$$

$$c \approx s_0 t$$

$$|v't| < 4$$

$$\Psi = \pi/4$$

The above equation indicates that the sound wavefront expressed by the equations (1) is spreading as an ellipsoidal surface with axial lengths a, b and c. FIG. 2 shows the elliptical intersection line of the surface with a plane of z=0 in the case where the second and higher order terms are also taken into considerations.

Although v' and s' are functions of y, when an appropriate range of y is selected, they can be thought to be constant, so that v and s can be approximated by the equations (3) and (4). It can be generally verified by repeating the above procedures that the wavefront of sound is an ellipsoidal surface.

By taking the partial differentiation of the equation (7) to obtain an equation of a normal to the ellipsoidal surface and substituting the values of the origin into the equation, the following equation is obtained.

$$\frac{x}{x - v't y/2 - v_0 t} = \frac{y}{-v't x/2 + y + (s's_0 + v'v_0)t^2/2} = \frac{z}{z} \quad (9)$$

The above equation represents a normal of the equation (7) passing through the origin O (0, 0, 0). This means that a radio wave emitted from the origin O is reflected by a point, which simultaneously satisfies the equations (7) and (9) (hereinafter referred to as P) to return to the origin O to be received.

When $z \neq 0$ and $v' \neq 0$, the following values are obtained from the equations (7) and (9). (When $v'=0$, the wavefront is a spherical surface.)

$$x = \left(v_o + \frac{s'}{v'} s_o\right) t$$

$$y = -\frac{2v_o}{v'}$$

$$z = \pm \sqrt{1 - \left(\frac{s'}{v'}\right)^2 - \left(\frac{s't}{2}\right)^2 - \left(\frac{2v_o}{v't s_o}\right)^2} \, s_o t$$

The value of y in the above equation is often negative in the case of the normal atmosphere, and the value of z is often an imaginary number. In other words, when $z \neq 0$ and $v' \neq 0$, it is often the case that the angle of elevation of the point of reflection viewed from the source of sound is negative or there is no point of reflection. Therefore, only the case when $z=0$ and $v' \neq 0$ is considered hereinafter.

When $z=0$ and $v' \neq 0$, the equations (7) and (9) can be expressed as $$(x - v_o t)^2 + (y + \tfrac{1}{2} s' s_o t^2)^2 - (x - v_o t) y v' t = (s_o t)^2 \tag{10}$$

$$x^2 - y^2 - (v_o + s'/v' s_o) t x - 2 v_o v' y = 0 \tag{11}$$

Since $|v_o| < s_o$, the equation (10) represents an ellipse containing the origin O. On the other hand, the equation (11) represents a rectangular hyperbola passing through the origin O. By shifting the origin in the equation (11) to $$(\tfrac{1}{2} v_o t + \tfrac{1}{2} s'/v' s_o t, \; -v_o/v') \quad \xi^2 - \eta^2 = R^2$$

where $\xi, \eta$: variables after the coordinate transformation $$R^2 = \left[\left(\frac{s' s_o}{2 v'}\right)^2 + \frac{1}{2} \frac{s'}{v'} s_o v_o + \left(\frac{1}{4} - \frac{1}{(v' t)^2}\right) v_o^2\right] t^2$$

Figure 2:
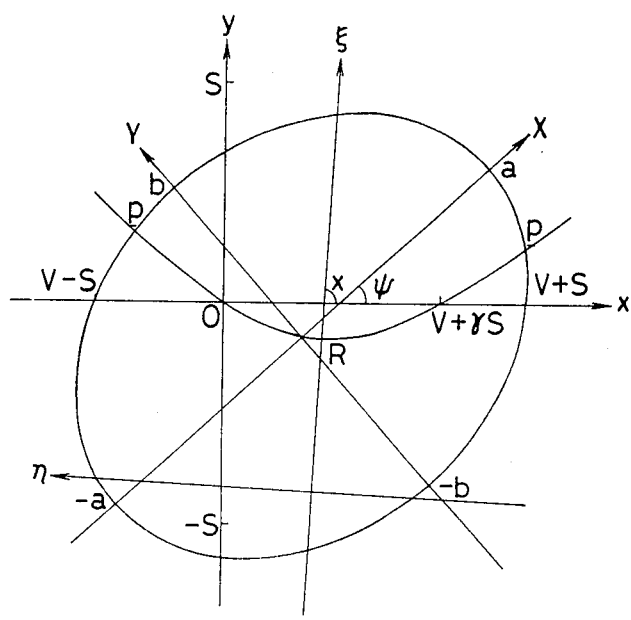
FIG. 2 is an explanatory view illustrating the wavefront of sound and a normal passing thereto passing through the sound source.

An example of the hyperbola in the case where the second and higher order terms of s't and y't are also taken into considerations is shown in FIG. 2. In FIG. 2, x and $\phi$ show angles of the principal axes with x-axis, $V = v_o t$, $S = s_o t$, and $\gamma = s'/v'$. The point P (x, y, 0) which simultaneously satisfies the equations (10) and (11) is the point of reflection to be obtained. As noted before, the ellipse of the equation (10) contains the origin O and the curve of the equation (11) passes through the origin O. Therefore, the simultaneous equations (10) and (11) have at least two sets of real solutions. In the case of the normal atmosphere, at least one of these solution sets has a positive value of y. When $|s'| < |v'|$, we have two real solution sets where y is positive, that is, the angle of elevation is positive.

Figure 3A:
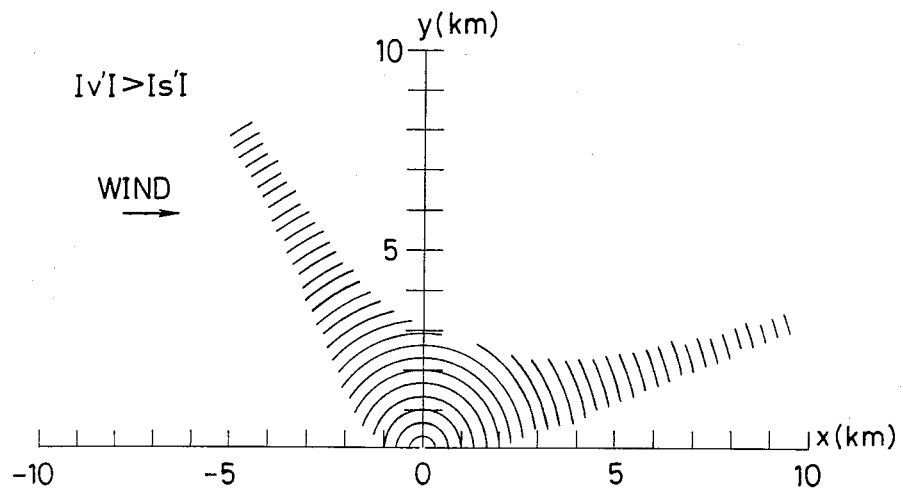
FIG. 3(a) is an explanatory view illustrating formation of a radio wave reflection zone when the wind shear is larger than the sound speed shear.
Figure 3B:
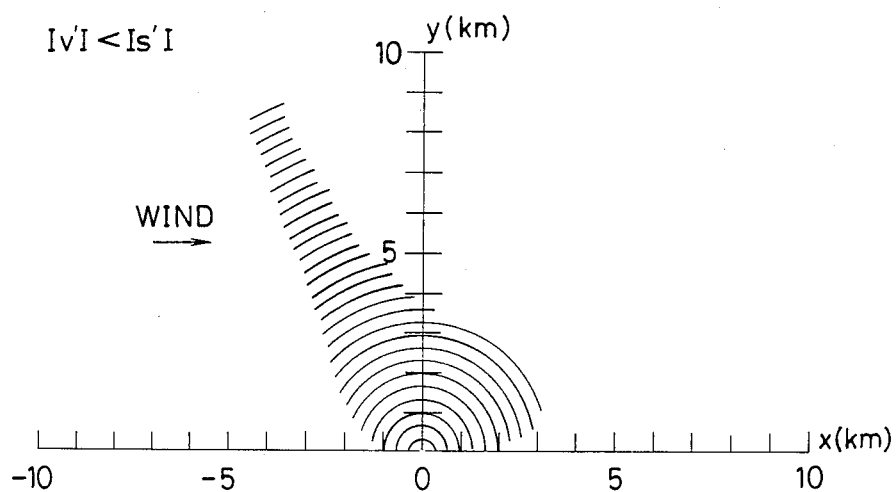
FIG. 3(b) is an explanatory view illustrating formation of a radio wave reflection zone when the wind shear is smaller than the sound speed shear.

FIGS. 3(a) and 3(b) each show a zone where the antenna beam direction and wavefront of sound intersect perpendicularly (radio wave reflection zone) in the case where a radio wave antenna with an aperture diameter D of 100 m and a sound wave generator are disposed at the same point on the ground (origin). Here, $s_o$ is 331 m/sec., s' is $2.86 \times 10^{-3}$ 1/sec., and $v_o$ is 0.1 m/sec. FIG. 3(a) shows the radio wave reflection zone in the case where v' is $3.37 \times 10^{-3}$ 1/sec., and $|v'| > |s'|$. FIG. 3(b) shows the radio wave reflection zone when v' is $2.25 \times {}^{-3}$ 1/sec. and $|v'| < |s'|$. The radio wave reflection zone is formed up to a height of about 3 km in the zenith direction, while it is formed up to a height of about 8 km in the directions of antenna elevation angles of 110° to 120°. It will be seen from FIGS. 3(a) and 3(b) that reflected radio waves can be received from wavefronts of sound at a large height through scanning of the antenna beam direction.

The measurement of the height distributions of the atmospheric temperature and wind velocity will now be described. First, measurement of the height distributions of the wind velocity and atmospheric temperature using reflected radio waves from wavefronts of sound and scattered radio waves due to atmospheric turbulence will be described. Through the scanning of the antenna beam direction of a Doppler radar such that the antenna beam direction perpendicularly intersects a wavefront of sound, the radar receives reflected waves from wavefronts of sound. Thus, a height distribution of the speed of the wavefront of sound can be obtained from the Doppler frequency of the reflected wave from each of points at a height interval. The speed of the wavefront of sound is the sum of the beam direction component of the speed of the wind and the speed of sound. Further, the radar can receive scattered radio waves due to the atmospheric turbulence. Therefore, the height distribution of the wind velocity can be obtained from the Doppler frequency of the scattered wave from each of points at a height interval. The height distribution of the sound speed can be obtained by subtracting the beam direction component of the speed of the wind from the speed of the wavefront of sound at each of points at a height interval. The speed of sound in the atmosphere is proportional to the square root of the absolute atmospheric temperature. It is thus possible to obtain the height distribution of the atmospheric temperature from the height distribution of the sound speed.

Now, the measurements of the height distributions of the wind velocity and atmospheric temperature using only reflected waves from wavefronts of sound will be described.

First, a method of obtaining the wind speed v and speed s of sound in the case where there are two reflection points having positive angles of elevation will be shown.

Figure 4:
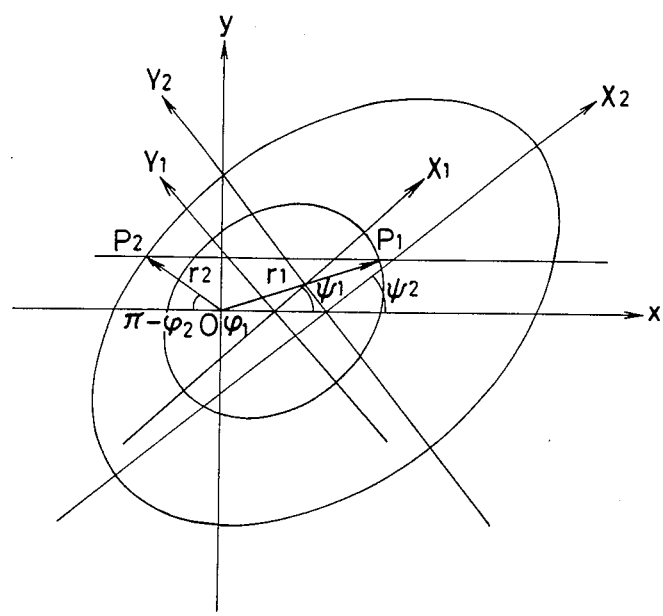
FIG. 4 is a view illustrating the principles underlying the determination of the speed of sound and wind speed.

One of the two reflection points at instant $t_1$ is denoted by $P_1$, and its elevation angle or supplement thereto and distance from the origin O are denoted by $\phi_1$ and $r_1$, respectively (see FIG. 4). One of the two reflection points, whose elevation angle or supplement thereto is different from $\phi_1$ at instant $t_2$, is denoted by $P_2$, and its elevation angle or supplement thereto and distance from the origin O are denoted by $\phi_2$ and $r_2$, respectively. $r_i$ (i being hereinafter 1 or 2) takes continuous values. Therefore, $r_i$ and $\phi_i$ at a given height y can be obtained, which satisfy an equation $$y = r_1 \sin \phi_1 = r_2 \sin \phi_2 \tag{12}$$

As in the ordinary RASS, the value of $r_i$ can be calculated from the propagation time of the sound wave pulse or radio wave pulse. $\phi_i$ is the elevation angle or supplement thereto of the receiving antenna.

From the general relation between the speed $s + v \cos \phi_i$ of motion of a wavefront and Doppler frequency $\Delta f_i$, we can obtain equations $$\lambda \Delta f_1/2 = s + v \cos \phi_1$$

$$\lambda \Delta f_2/2 = s + v \cos \phi_2 \tag{13}$$

where $\lambda$ is wavelength of the transmitted radio wave, and $\Delta f_i$ Doppler frequency of the reflected wave from $P_i$.

By solving the above equation for v and s, we have $$v = \frac{\lambda(\Delta f_1 - \Delta f_2)}{2(\cos \phi_1 - \cos \phi_2)} \tag{14}$$

$$s = \frac{\lambda(\Delta f_2 \cos \phi_1 - \Delta f_1 \cos \phi_2)}{2(\cos \phi_1 - \cos \phi_2)} \tag{15}$$

When there is only a single reflection point having a positive elevation angle, that is, when $|v'| < |s'|$, the wind speed v and speed s of sound can be obtained, although the accuracy is somewhat reduced, by a method to be described hereinunder. Hereinunder, the subscripts of r, t, P, f are omitted when there is a single reflection point.

By transforming the equations (10) and (11) and omitting the second order terms of s't, the following equations can be obtained.

$$-(x - v_o t) t v' y + s_o t^2 s' y + (x - v_o t)^2 + y^2 = (s_o t)^2$$

$$(x^2 - y^2 - v_o t x) v' - s_o t x s' - 2 v_o y = 0$$

By obtaining $v'y$ and $s'y$ from the above equations, substituting into the resultant the equations (12), i.e., $y = r \cdot \sin \phi_i$ and $x = r \cdot \cos \phi_i$, and omitting the second and higher order terms of $r - s_o t$ and $v_o t$, the following equations are obtained.

$$v'y = 2\{(r/t - s_o) \cos \phi_i - v_o\}/\sin^2 \phi_i \tag{16}$$

$$s'y = 2\{(r/t - s_o) \cos 2\phi_i - v_o \cos^3 \phi_i\}/\sin^2 \phi_i \tag{17}$$

If the terms of $v_o$ in the above equations can be ignored, from the ratio of the above equations (16) and (17) and also from the equations (3), (4) and (13) the following equations are obtained.

$$v'y = (\lambda \Delta f/2 - s_o - v_o \cos \phi_i) \cos \phi_i / \sin^2 \phi_i \tag{16'}$$

$$s'y = (\lambda \Delta f/2 - s_o - v_o \cos \phi_i) \cos 2\phi_i / \sin^2 \phi_i \tag{17'}$$

By substituting the equations (16) and (17) or equations (16') and (17') into the equations (3) and (4), v and s at a point at a height y can be obtained. By transforming the equation (2) representing the absolute value of the speed of sound, the following equation is obtained.

$$T = s^2/20.0463^2 \text{ (s being in m/sec.)} \tag{18}$$

From the above equations (14) and (15), or equations (3), (4), and equations (16) and (17) or equations (16') and (17'), and equation (18), the wind speed and atmospheric temperature at a point at a height y as represented by the equation (12) are determined. The wind direction is the azimuth angle $\alpha$ of the receiving antenna corresponding to $P_i$ or the opposite direction.

As noted above, $\phi_i$ is in the range of 0 to $\pi$, and r takes continuous values, so that it is possible to draw profiles of the height distributions of the wind velocity and atmospheric temperature.

Figure 5:
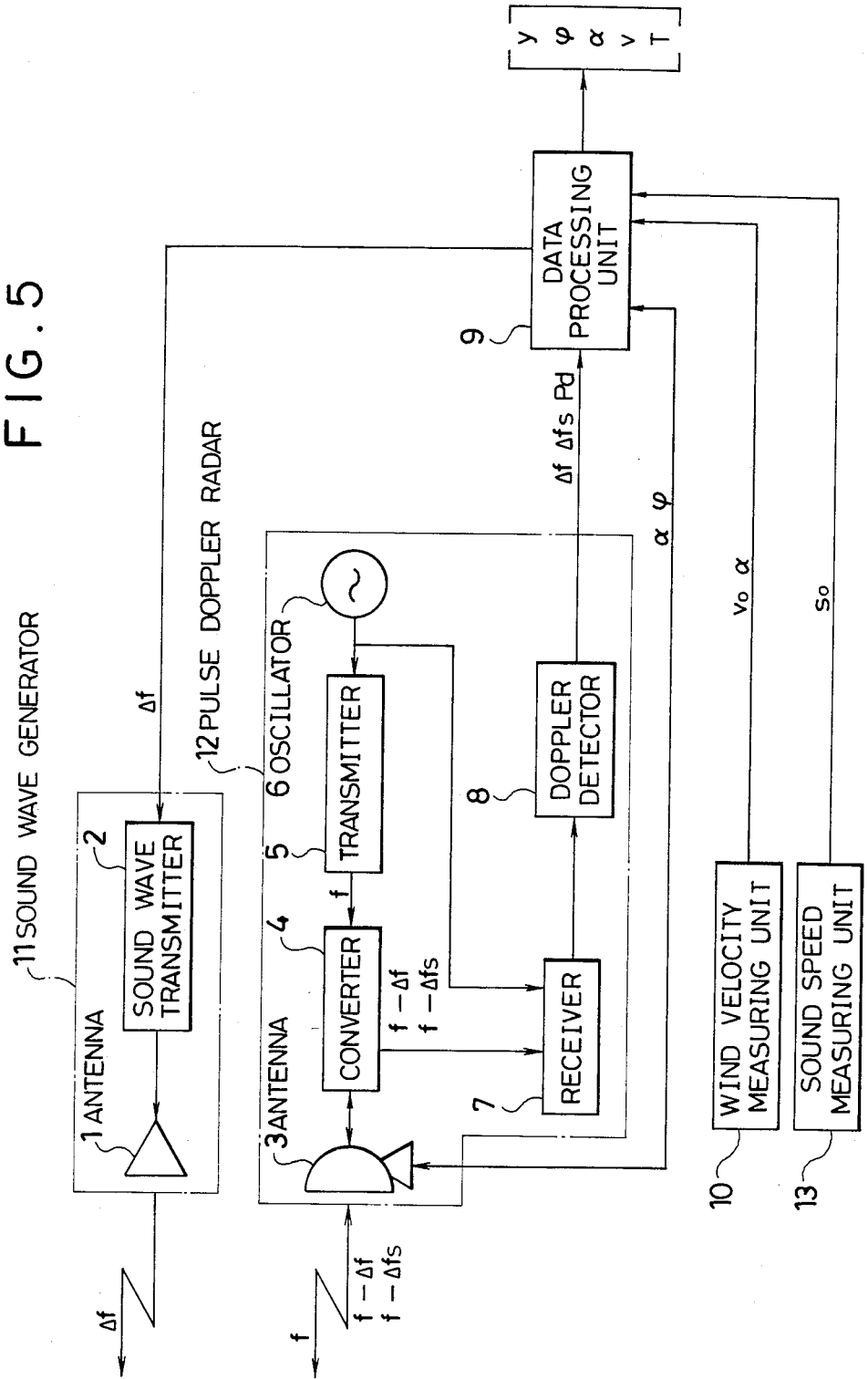
FIG. 5 is a block diagram showing a system for measuring height distributions of the atmospheric temperature and wind velocity according to the present invention.
Figure 6:
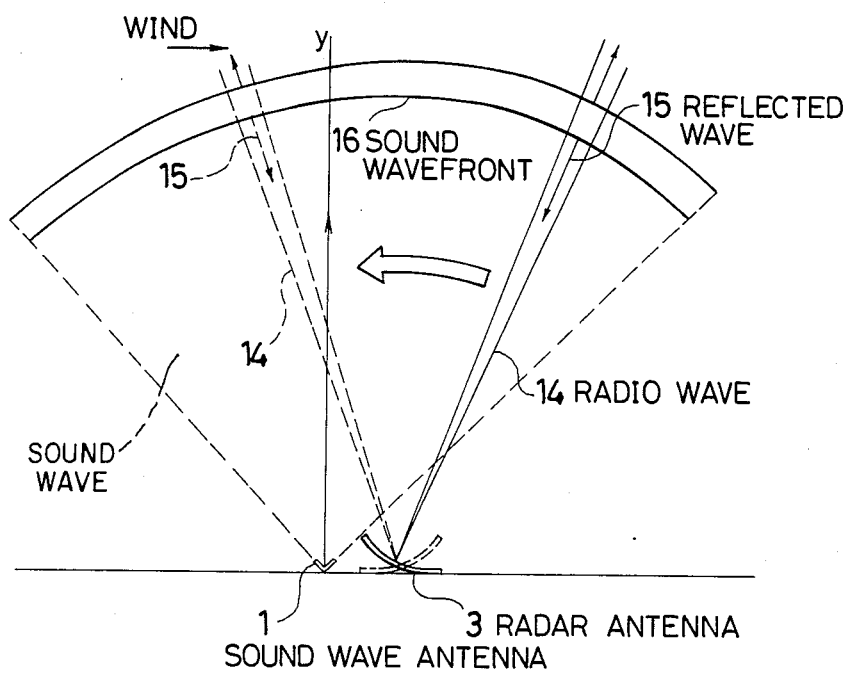
FIG. 6 is an explanatory view illustrating a state in which the radio waves emitted from the system of FIG. 5 are reflected by the sound wavefronts and then received by the antenna.

Now, a system for measuring height distributions of the wind velocity and atmospheric temperature according to the invention will be described with reference to FIGS. 5 and 6. The system illustrated comprises a sound wave generator 11, a pulse Doppler radar 12, an on-ground sound speed measuring unit 13, an on-ground wind velocity measuring unit 10 and a data processing unit 9. The sound wave generator 11 includes a sound wave antenna 1 and a sound wave transmitter 2. The pulse Doppler radar 12 includes a radio wave antenna 3, a transmission/reception converter 4, a transmitter 5, an oscillator 6, a receiver 7 and a Doppler detector 8.

The sound wave antenna 1 is connected to the sound wave transmitter 2, which is in turn connected to the data processing unit 9. The radio wave antenna 3 can be connected to the transmitter 5 and receiver 7 through the transmission/reception converter 4. The antenna 3 is used for transmitting and receiving radio waves. Where exclusive antennas for the transmission and reception respectively are provided, the converter 4 is unnecessary. The elevation and azimuth angles of the antenna 3 are preset according to commands from the data processing unit 9. The transmitter 5 and receiver 7 are connected to the oscillator 6. The receiver 7 is also connected to the data processing unit 9 through a Doppler detector 8. The on-ground sound speed measuring unit 13 and on-ground wind velocity measuring unit 10 are connected to the data processing unit 9.

The sound wave emitted from the sound wave generator 11 is either a pulse wave or a continuous wave. The sound wave transmission frequency suitably ranges from 60 to 6,000 Hz. The sound wave transmission output (SPL) suitably ranges from 130 to 150 phons. Sound waves outside this range are greatly attenuated and also require special devices, so that they are not economical. The sound wave antenna 1 may be a palabola antenna, a horn antenna, etc. The sound wave transmitter 2 should be capable of sound wave transmission frequency variation. The reason for this is as follows. When reflected waves from sound wavefront composed of several tens of layers are received in the same phase, the power of the received waves is maximum. That is, the received power is maximum when the wavelength of sound meet the Bragg's resonant condition with respect to the transmitted radio wave, that is, the wavelength of the transmitted radio wave is double the distance between adjacent wavefronts. To meet this condition, it is necessary to control the frequency of the transmitted sound wave. For this reason, the sound wave transmitter 2 should be capable of sound wave transmission frequency variation.

With the measuring system having the construction described above, measurement of height distributions of atmospheric temperature and wind velocity based on the reflected radio waves from the wavefront of sound and the scattered waves produced by the atmospheric turbulence will now be described.

The operation of the pulse Doppler radar 12 causes the radio wave antenna 3 to emit radio waves of a frequency f and to receive scattered waves produced by the atmospheric turbulence at altitudes each corresponding to the product of a resolution $\Delta y$ and an integer (hereinafter referred to simply as "at each of the altitudes"), and the height distribution of wind velocity is determined from Doppler frequencies of the scattered waves received by the radio wave antenna 3. To be specific, the scattered waves whose beams intersect at right angles are received by the radio wave antenna 3, with the angle of elevation of the radio wave antenna 3 kept at a given value in the range of 15° to 165°. The received scattered wave signal is fed to the Doppler detector 8 for orthogonal detection and analog-to-digital conversion for every integral multiple of $\Delta y$. The conversion output is coupled as a time series of samples from the same height for each pulse to the fast Fourier transformation (FFT) unit for the FFT with a frequency resolution of 0.2 Hz to detect the Doppler frequency. Thus, Doppler frequencies with respect to two different orthogonal, azimuth angles are detected at a height interval. The data processing unit 9 converts the Doppler frequencies with respect to the two different azimuth angles into the height distribution of the wind velocity.

The data processing unit 9 determines the wind direction from the ground surface up to a height y (y=$\Delta y$) from the height distribution of the wind velocity on the basis of a preset value of height interval $\Delta y$ and sets the azimuth angle $\alpha$ of the radio wave antenna 3 as a leeward angle.

Then, the data processing unit 9 estimates the speed of sound at height y from sound speed shear s' and measured sound speed $s_o$ obtained by the on-ground sound speed measuring unit 13. At this time, an optimum frequency, at which the wavelength of radio wave and wavelength of sound wave are 2:1 at height y, is determined, and it is set in the sound wave transmitter 2. This frequency signal is amplified and transmitted as sound wave from the antenna 1 toward the zenith. Simultaneously with the transmission of the sound wave, the elevation angle $\phi$ of the antenna 3 transmitting radio wave pulses is scanned such that it is increased continuously from about 15°. When the radio wave beam becomes orthogonal to the rising wavefront of sound, the wave is reflected by the wavefront of sound to be received by the antenna 3. The reflected signal received by the antenna 3 is fed to the receiver 7 to be compared with a preset value. When the intensity of the received signal exceeds the preset value it is determined to be a radio wave reflected by the wavefront, so that the signal is fed through the Doppler detector 8 to the data processing unit 9. The elevation angle $\phi$ of the antenna 3 at this time and the Doppler frequency $\Delta f$ of the reflected wave are stored in the data processing unit 9.

Simultaneously with the reflected wave from the wavefront of sound, the Doppler radar 12 receives scattered wave due to atmospheric turbulence. That is, the Doppler frequency $\Delta f$ of the reflected wave and Doppler frequency $\Delta f_s$ of scattered wave with the azimuth angle $\alpha$ and elevation angle $\phi$ of the antenna are detected simultaneously with respect to the height y.

From these Doppler frequencies $\Delta f$ and $\Delta f_s$ the accurate Doppler frequency ($\Delta f_1 + \Delta f_s$) of the speed of sound is calculated. From this sound speed Doppler frequency the atmospheric temperature at height y is calculated using an equation (19).

$$T = \left( \frac{\lambda(\Delta f + \Delta f_s)}{2 \times 20.0403} \right)^2 \quad (19)$$

The height distribution of atmospheric temperature can be obtained by following the operation described above at each of the altitudes.

Now, a method of measuring height distributions of the wind velocity and atmospheric temperature from sole reflected radio waves received by the antenna 3 will be described.

First, measured values of the wind direction and wind speed $v_o$ are fed from the on-ground wind velocity measuring unit 10 are fed to the data processing unit 9 to estimate the wind direction at the height y and the azimuth angle $\alpha$ of the antenna 3 is set leeward. Then, measured sound speed $s_o$ is fed from the on-ground sound speed measuring unit 13 to the data processing unit 9, and the optimum frequency of the sound wave to be emitted is determined from the sound speed $s_o$ and the sound speed shear s'. The output of the data processing unit 9 is then fed to the sound wave transmitter to transmit a sound wave at the optimum frequency from the sound wave antenna 1. Then, radio wave pulses transmitted from the antenna 3, while the elevation angle $\phi$ of the antenna 3 is increased continuously until a reflected wave is received by the antenna 3. When the receiver 7 receives a reflected wave having an intensity in excess of a preset value, it feeds a signal to the data processing unit 9 to set the elevation angle $\phi$ of the antenna 3, and the frequency of the sound wave transmitted from the sound wave generator 11 is controlled to one half the wavelength of the radio wave, thus maximizing the intensity of the reflected wave received by the antenna 3. When the maximum received reflected wave intensity is obtained, the azimuth angle $\alpha$ of the antenna 3 is scanned continuously to the left and right by a preset value $\Delta \alpha$ for measuring the accurate wind direction. An azimuth angle $\alpha$, at which the Doppler frequency of the reflected wave is maximum or minimum, is detected, and the wind direction is determined.

More specifically, when the beam direction of the antenna 3 is windward and the difference between the wind vector and azimuth direction of the antenna is $\Delta \alpha_w$, the velocity of sound is in the beam direction, while beam direction component of the velocity v of wind is a quantity, which has a magnitude of v cos $\phi$ cos $\Delta \alpha_w$ where $\phi$ and $\Delta \alpha_w$ are respectively the elevation angle of the antenna and the azimuth angle difference.

Thus, the speed of the wavefront of sound in the beam direction at height y is expressed as the difference between the sound speed and v cos $\phi$ cos $\Delta \alpha_w$. When the elevation angle of the antenna 3 is fixed, the speed of the wavefront of sound is minimum when $\Delta \alpha_w=0$, i.e., when the wind direction coinsides with the azimuth direction. When the beam direction of the antenna is leeward, the speed of the wavefront of sound in the beam direction is the sum of the speed of sound and v.cos $\phi$.cos $\Delta \alpha_w$ and is maximum when $\Delta \alpha_w=0$.

In the above way, the azimuth angle $\alpha$ and elevation angle $\phi$ of the antenna 3 at height y are determined, the speed of the wavefront of sound is calculated from the Doppler frequency $\Delta f$ with the azimuth angle $\alpha$ and elevation angle $\phi$ of the antenna, and the wind direction is determined from the azimuth angle $\alpha$.

Now, measurement of the wind speed and speed of sound at height $Y_1$ will be described. The azimuth angle $\alpha_1$ of the antenna 3 is set such that the antenna is leeward, and radio wave pulses are transmitted while increasing the elevation angle of the antenna 3 until a reflected wave from a sound wavefront at height $Y_1$ is obtained. When a reflected radio wave having a predetermined intensity is obtained, the elevation angle $\phi_1$ of the antenna 3 and the Doppler frequency $\Delta f_1$ of the reflected wave at this time are measured and memorized. Then, the azimuth angle of the antenna is set to $\alpha_1 + 180°$, and the elevation angle is scanned until a reflected wave at the same height $Y_2$ is received by the antenna 3. The elevation angle $\phi_2$ of the antenna 3 and Doppler frequency of the reflected wave, when this reflected wave is received, are measured.

When the Doppler frequencies $\Delta f_1$ and $\Delta f_2$ and elevation angles $\phi_1$ and $\phi_2$ with respect to the same height are obtained, the accurate sound speed and wind speed are calculated using the equations (14) and (15).

The above operation is repeatedly performed by increasing the height at an interval $\Delta y$ to obtain height distributions of the atmospheric temperature, wind direction, and wind speed.

A method for measuring the height distributions of atmospheric temperature, wind direction and wind speed by the use of a single reflection point when the ground wind velocity is low, will now be described.

In the same manner as in the aforementioned method using two wave reflection points at the same altitude, the wind direction is measured and, at the same time, the Doppler frequency $\Delta f_i$ of the reflected waves and the angle of elevation $\phi_i$ of the radio wave antenna are also measured. The ground wind speed $v_o$ and sound speed $s_o$ are measured by the on-ground wind velocity measuring unit 10 and the on-ground sound speed measuring unit 13, respectively.

Functions $v'y$ and $s'y$ at the altitude y are first determined from the equations (16') and (17'), then wind speed v is determined from the equation (3) and temperature T is determined from the equations (4) and (18).

The same operation as described above is repeated while the measuring altitude is increased. As a result, the height distributions of atmospheric temperature and wind velocity can be obtained.

Now, an example of formation of height distributions of the atmospheric temperature and wind velocity with the system according to the present invention will be described.

The sound wave generator and pulse Doppler radar used were of the specifications as shown in Tables 1 and 2, respectively.

TABLE 1

| | |
|---|---|
| Transmission frequency: | 70–120 Hz |
| Transmitted power: | 200 W (sound wave output) |
| Pulsewidth: | 0.5–1 sec. |
| Pulse repetition period: | 8–16 pulses per 15–31 seconds. |
| Antenna beamwidth: | 90° |

TABLE 2

| | |
|---|---|
| Transmission frequency: | 46.5 MHz |
| Bandwidth: | 1.65 MHz |
| Transmitted power: | 1 MW |
| Subpulse duration: | 2 μsec. |
| Pulse repetition period: | 400 μsec. |
| Antenna beamwidth: | 3.6° |
| Antenna gain: | 33 dB |
| Coherent integral: | 4 times |

The Doppler radar antenna was a phased array antenna consisting of a circular array of 475 Yagi antennas and having a large aperture diameter of 100 m. It had a sharp directivity of 3.6°, and its beam direction could be quickly and readily scanned in a zenith angle range of ±30° and azimuth angle range of 0° to 360° through phase control of the transmitted signal.

The receiver of the Doppler radar included a fast Fourier transformation (FFT) unit for analyzing a Doppler signal at a high speed and could form height distributions of the speeds of scattering and reflecting bodies.

The azimuth angle of the antenna was set to 0° and 90°, and pulses of a radio wave at a frequency of 46.5 MHz were transmitted with a pulse duration of 2 μsec. and at an interval of 400 μsec., for measuring the height distributions of the wind direction and wind speed from the atmospheric turbulence. According to the obtained wind direction value, the sound wave antenna was arranged on the windward side of the radar antenna and on a straight line extending in the wind direction. As the sound wave antenna was used a hyperbolic horn with a length of 2.5 m, an aperture diameter of 0.7 m and a cutoff frequency of 70 Hz. In the data processing unit, the radio wave reflection zone was determined using the obtained height distribution of the wind speed, an antenna aperture diameter of 100 m, an inter-antenna distance of 181 m and past height distribution of the atmospheric temperature.

Figure 8:
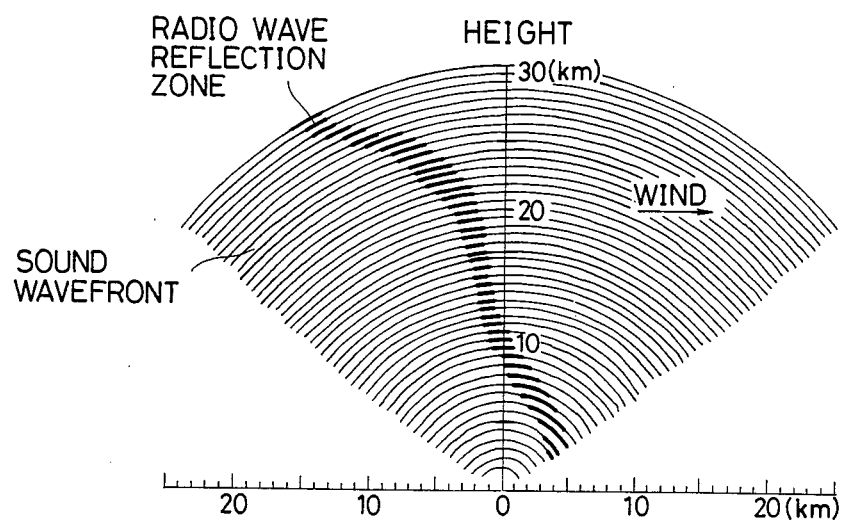
FIG. 8 is an explanatory view illustrating a radio wave reflection zone in a sound wavefront.

FIG. 7(a) shows an obtained height distribution of the wind speed in the southern and northern directions. FIG. 7(b) shows an obtained height distribution of the wind speed in the eastern and western directions. FIG. 8 shows a radio wave reflection zone which was determined by the data processing unit using the height distribution of the wind speed shown in FIGS. 7(a) and 7(b) and that of the atmospheric temperature.

Next, a radio wave reflection zone in a desired height range of 8,000 to 12,000 m was determined using FIG. 8 with the radar antenna azimuth and elevation angles set to 295° and 98°. At the same time, the speed of a reflecting surface in the height range noted above was determined from the height distributions of the atmospheric temperature and wind speed, and the frequency of sound wave transmitted from the sound wave generator was set to 88 to 90 Hz according to the speed of reflecting surface and wavelength of radio wave. As the transmitter of the sound wave generator was used a pneumatic acoustic generator. As large sound pressure output as 130 to 150 phons was generated, and the sound generated from the transmitter is transmitted into the atmosphere from a hyperbolic horn by varying the frequency in the ragne of 88 to 90 Hz according to the height.

The radar antenna elevation angle was scanned in the increasing direction from 80° at a rate of 2°/400 μ sec., and radio wave pulses with a pulse duration of 2 μ sec., a distance resolution of 300 m and a repetition period of 400 μsec. were transmitted from the antenna when the sound wave reached the height range for measurement. The reflected radio wave signal received by the antenna was detected for analog-to-digital conversion at a height interval. The conversion output was coupled as a time series of samples from the same height for each pulse to the FFT unit for the fast Fourier transformation with a frequency resolution of 0.2 Hz to detect the Doppler frequency, which was converted into the sound wavefront speed.

Figure 9:
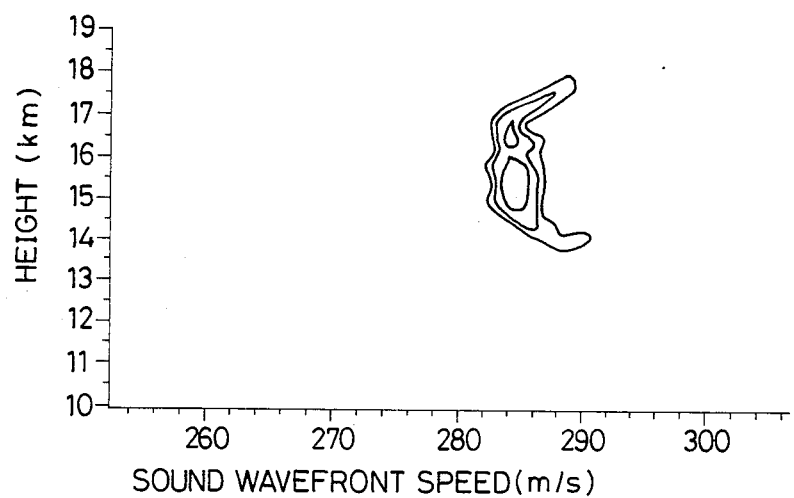
FIG. 9 is a graph showing power spectra of the sound wavefront speed.

After the measurement of the speed of the sound wavefront at each of the altitudes, display of contour of power spectra having its lateral axis graduated for speeds of the sound wavefront and its vertical axis graduated for altitudes has been outputted by a printer terminal. FIG. 9 is a graph showing one example of outputted display of the contour of power spectra.

Both the speed of the sound wavefront and the altitude at a point where the power of the reflected waves received is the maximum have been read from the data of the power spectrum contour display. The wind speed component has been removed from the speed of the sound wavefront by using the wind speed measured by the pulse Doppler radar to obtain sound speed. The sound speed has been determined in terms of temperature to obtain a height distribution of atmospheric temperature.

Figure 10B:
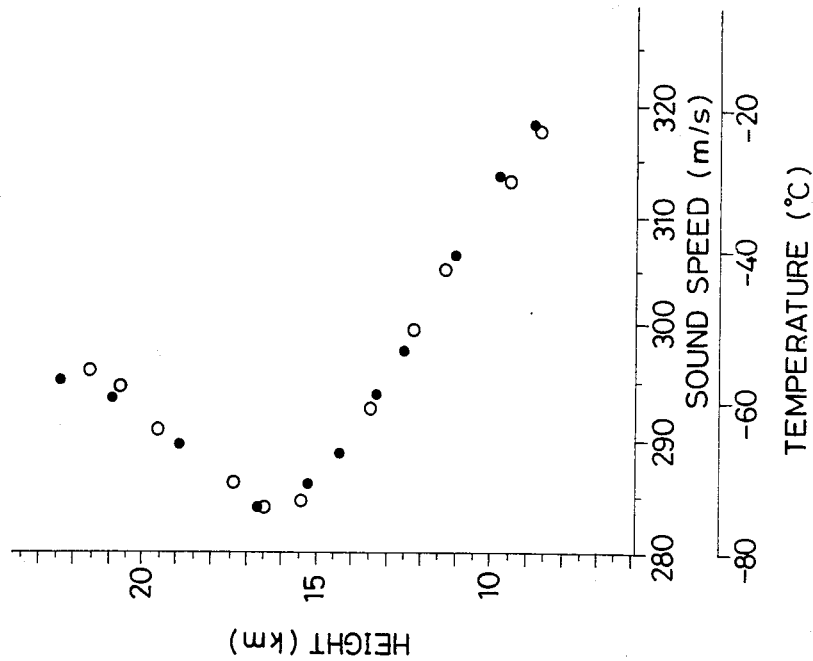
FIG. 10(b) is a plotting diagram showing a height distribution of temperature measured.
Figure 10A:
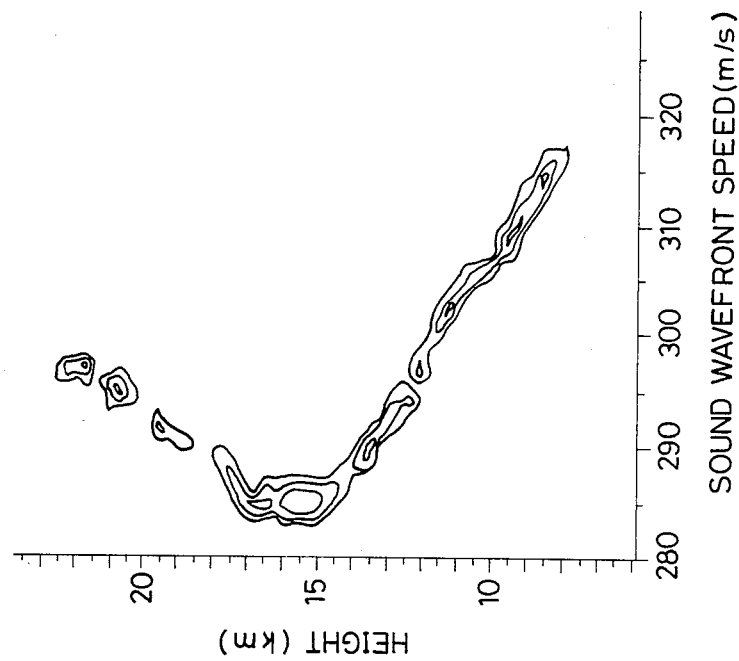
FIG. 10(a) is a graph showing a contour of the power spectra of the sound wavefront speed.

By repeating the aforementioned operation there has been obtained a height distribution of tropospheric temperatures to stratospheric temperatures, one example of which is as shown in FIGS. 10(a) and 10(b). FIG. 10(a) is a graph showing a synthesized display output of the contour of the power spectra measured. In this graph, the vertical axis is graduated for altitudes and the lateral axis for speeds of the sound wavefront corresponding to the Doppler frequencies. FIG. 10(b) is a graph showing one example of the measured height distribution of temperature, in which blank circles represent the temperatures measured by the system of the present invention and solid circles represent those measured by a radio sonde. As is clear from FIGS. 10(a) and 10(b), the temperatures measured by the present system are in good agreement with those measured by the radio sonde.

Table 3 shows the results of determination of the wind speed from the reflected waves of two radio waves at a height of 6,500 m with elevation angles of 110° and 120° (i.e. with angles 20° and 30° greater than the maximum elevation angle, that is to say 110° and 120° with respect to the horizon) through scanning of the antenna in the same wind direction plane. Table 4 shows the results of determination of the wind speed from the reflected wave of a single radio wave. In these tables the observed values are wind speed values actually measured with the Doppler radar. It will be seen from the tables that the two wind speed values are close to each other, verifying that the measurement system according to the invention is an accurate system.

TABLE 3

| Height (km) | Supplement to elevation angle (°) $\phi$ | $\phi$ | Speed of reflecting point (m/sec.) $\Delta v$ | $\Delta v$ | Wind speed (m/sec.) Calculated value | Observed value |
|---|---|---|---|---|---|---|
| 6.5 | 110 | 120 | 302.6 | 298.6 | 25.7 | 26.5 |

TABLE 4

| Height (km) | Supplement to elevation angle (°) | Speed of reflecting Point (m/sec.) | Wind speed (m/sec.) Calculated value | Observed value |
|---|---|---|---|---|
| 6.0 | 120 | 302.1 | 25.5 | 27.6 |
| 6.5 | 120 | 298.6 | 27.8 | 26.5 |

As has been described in the foregoing, according to the invention it is possible to obtain measurements of the wind direction and wind speed like the measurement of the atmospheric temperature and to extend the height range of measurement up to about 20 km without being influenced by winds unlike the measurements with the prior art RASS.

The system according to the invention permits formation of height distributions of the atmospheric temperature, wind direction and wind speed among the meteorological elements, while it is very inexpensive compared with a profiler consisting of a combination of a radar and a radio meter. Besides, atmospheric temperatures at heights above several killometers can be measured more accurately. Further, unlike the presently broadly used radio sonde, automatic and continuous observation is possible.

With the above advantages the invention can be utilized for observations of limited meterological elements or supplementary meteorological observations, specifically meteorological observations in airports, monitoring of pollution of the atmosphere and time-wise space-wise supplementary observations to high space radio sonde observations.

What is claimed is:

1. A system for measuring height distribution of the atmospheric temperature, wind direction and wind speed comprising:
   radio generating means for generating and receiving directional radio waves;
   an on-ground sound measurement unit for measuring the on-ground sound speed;
   a sound wave generating means for generating a sound wave;
   calculating means coupled to said radio means and said on-ground sound measurement unit, and said sound wave generating means for:
   calculating the Doppler frequencies of received scattered radio waves from said radio means;
   inferring a radio wave reflection zone formed by sound waves from the determined height distributions of the wind direction and wind speed and a presumed height distribution of the atmospheric temperature;
   calculating and setting an azimuth angle and elevation angle of said radio means such that the radio wave produced are directed to a measurement zone falling within said inferred reflection zone;
   controlling said radio means so as to generate a radio wave pulse;
   calculating the speed of sound within the measurement zone based on the measurement from said on-ground sound measurement unit, the determined height distribution of the wind direction, wind speed and the presumed height distributions of the atmospheric temperatures;
   calculating sound wave frequencies such that the ratio of the wavelength of radio waves to the wavelength of the sound waves in the measurement zone is 2:1;
   transmitting through said sound wave generating means sound waves having the calculated frequencies successively into the atmosphere;
   storing in memory the elevation angle and the Doppler frequency of the radio wave returned from the radio signal sent by the radio generating means in a memory, when a radio wave is reflected by a sound wavefront;
   calculating from said stored information the high atmospheric temperature.

2. A system as in claim 1 further comprising: an on-ground wind direction measuring unit; and wherein said calculating means also is for:
   determining an azimuth angle for said radio wave generating means based upon the estimated wind direction;
   optimizing the sound waves produced by said sound wave generating means based upon the measured speed of sound, the reduction ratio of said speed of sound and the calculated speed of sound;
   controlling said radio generating means such that pulses are transmitted until a reflected wave is received in excess of a preset value;
   storing the elevation angle of said radio generating means;

controlling the frequency of the sound wave of said sound wave generating means such that said sound wave's frequency is one half of the wavelength of the radio wave;

controlling said radio generating means such that said means is scanned continuously to the left and right with respect to its azimuth angle;

detecting from said radio generating means when the Doppler frequency of the reflected radio wave is at its maximum or minimum;

determining the wind direction from said detected maximum or minimum Doppler frequency;

setting the azimuth angle of said radio generating means to setting 180° larger;

causing said radio generating means to be scanned with respect to its elevation angle until it receives a reflect wave at the same elevation angle as said stored angle;

storing said elevation angle and the Doppler frequency of said received wave;

calculating the sound speed, wind speed and atmospheric temperature based upon said stored data;

repetitively carrying out the process so as to obtain height distribution, wind directions, wind speeds and atmospheric temperatures.

3. A system for measuring height distributions of the atmospheric temperature, wind direction and wind speed comprising:

an on-ground wind direction measuring unit for measuring wind direction in a given height range;

radio wave generating means having a variable azimuth and elevation angle for transmitting and receiving radio pulses;

on-ground sound speed measuring means for measuring on-ground sound speed;

sound generating means for generating sound waves;

calculating means coupled to the on-ground wind direction measuring unit, said radio wave and sound wave generating means and said on-ground sound speed measuring means for:

transmitting radio wave pulses by determining the azimuth angle of a radio wave from said wind direction;

causing the reception of a radio wave orthogonally reflected after transmission through continuous scanning of the elevation angle of the antenna;

for stopping the antenna elevation angle scanning upon reception of a radio wave and then controlling the frequency of the transmitted sound wave so as to obtain a maximum intensity of the received reflected wave;

determining the Doppler frequency and wind direction by detecting maximum and minimum Doppler frequencies through radio wave antenna azimuth angle scanning;

determining the wind speed and sound speed in a height range for measurement from the Doppler frequencies with respect to one point existing at a given height and from the elevation angle of the antenna; and determining a wind speed and a sound speed within the height range for measurement on the basis of the Doppler frequency, antenna angle of elevation measured and the values from the on-ground wind velocity measuring unit and the on-ground sound speed measuring unit; and determining the atmospheric temperature from the sound speed.

* * * * *